(12) United States Patent
Crawford et al.

(10) Patent No.: US 8,718,707 B2
(45) Date of Patent: May 6, 2014

(54) DEVICES, SYSTEMS, AND METHODS FOR COMMUNICATING WITH ROOFTOP AIR HANDLING UNITS AND OTHER HVAC COMPONENTS

(75) Inventors: Charles L. Crawford, Newcastle, OK (US); Harold L. Jeffery, Norman, OK (US)

(73) Assignee: Johnson Controls Technology Company, Holland, MI (US)

( * ) Notice: Subject to any disclaimer, the term of this patent is extended or adjusted under 35 U.S.C. 154(b) by 686 days.

(21) Appl. No.: 12/408,135

(22) Filed: Mar. 20, 2009

(65) Prior Publication Data
US 2010/0241275 A1 Sep. 23, 2010

(51) Int. Cl.
*H04B 1/38* (2006.01)

(52) U.S. Cl.
USPC .................. 455/557; 455/90.1; 455/556.1

(58) Field of Classification Search
USPC ....................... 455/557, 556.1, 90.1
See application file for complete search history.

(56) References Cited

U.S. PATENT DOCUMENTS

| | | | | |
|---|---|---|---|---|
| 5,595,342 A * | 1/1997 | McNair et al. | | 236/51 |
| 6,437,692 B1 * | 8/2002 | Petite et al. | | 340/540 |
| 6,997,390 B2 * | 2/2006 | Alles | | 236/49.4 |
| 7,248,893 B2 * | 7/2007 | Christensen et al. | | 455/556.1 |
| 7,437,150 B1 * | 10/2008 | Morelli et al. | | 455/420 |
| 7,720,436 B2 * | 5/2010 | Hamynen et al. | | 455/13.1 |
| 7,826,830 B1 * | 11/2010 | Patel et al. | | 455/414.1 |
| 7,904,631 B2 * | 3/2011 | Pham et al. | | 710/315 |
| 7,986,701 B2 * | 7/2011 | Kore et al. | | 370/401 |
| 8,054,182 B2 * | 11/2011 | Cutchis | | 340/539.22 |
| 8,199,005 B2 * | 6/2012 | Thomas et al. | | 340/540 |
| 8,376,242 B1 * | 2/2013 | Uselton | | 236/51 |
| 8,412,381 B2 * | 4/2013 | Nikovski et al. | | 700/276 |
| 2002/0011923 A1 * | 1/2002 | Cunningham et al. | | 340/310.01 |
| 2005/0194456 A1 * | 9/2005 | Tessier et al. | | 236/51 |
| 2005/0228607 A1 * | 10/2005 | Simons | | 702/122 |
| 2005/0270151 A1 * | 12/2005 | Winick | | 340/539.1 |
| 2006/0067209 A1 * | 3/2006 | Sheehan et al. | | 370/216 |
| 2006/0185373 A1 * | 8/2006 | Butler et al. | | 62/181 |
| 2006/0292996 A1 * | 12/2006 | Malasani et al. | | 455/78 |
| 2007/0158418 A1 * | 7/2007 | Weekes | | 235/384 |
| 2007/0232288 A1 * | 10/2007 | McFarland et al. | | 455/423 |
| 2009/0089214 A1 * | 4/2009 | Weston et al. | | 705/73 |
| 2010/0298988 A1 * | 11/2010 | Stachler et al. | | 700/276 |
| 2011/0016199 A1 * | 1/2011 | De Carlo et al. | | 709/220 |
| 2013/0067943 A1 * | 3/2013 | Douglas et al. | | 62/155 |
| 2013/0179373 A1 * | 7/2013 | Mutchnik et al. | | 705/412 |
| 2013/0185444 A1 * | 7/2013 | Meenan et al. | | 709/227 |

OTHER PUBLICATIONS

Bluetooth—Wikipedia, the free encyclopedia, http://en.wikipedia.org/wiki/Bluetooth#Bluetooth_devices, 19 pages, believed to be available before Jul. 4, 2008.

(Continued)

*Primary Examiner* — Thomas J Hiltunen
(74) *Attorney, Agent, or Firm* — Foley & Lardner LLP

(57) ABSTRACT

A device for communicating information from a controller for a rooftop air handling unit to a portable electronic device includes a wire terminal for wiring to the controller and for receiving a signal comprising information from the controller. The device further includes a transceiver configured to wirelessly transmit the information to the portable electronic device. The device yet further includes a circuit coupled to the wire terminal and the transceiver. The circuit is configured to extract the information from the signal. The circuit is further configured to provide the information from the wire terminal to the transceiver.

16 Claims, 10 Drawing Sheets

(56) References Cited

OTHER PUBLICATIONS

Bluetooth Glossary, Palowireless—Bluetooth Response Center, http://www.palowireless.com/INFOTOOTH/glossary. asp#inquiry%20Procedure, 25 pages, believed to be available before Jul. 4, 2008.

Bluetooth Engine API—Forum Nokia Wiki, http://wiki.forum.nokia.com/index.php/Bluetooth_Engine_API, 7 pages, believed to be available before Jul. 4, 2008.

* cited by examiner

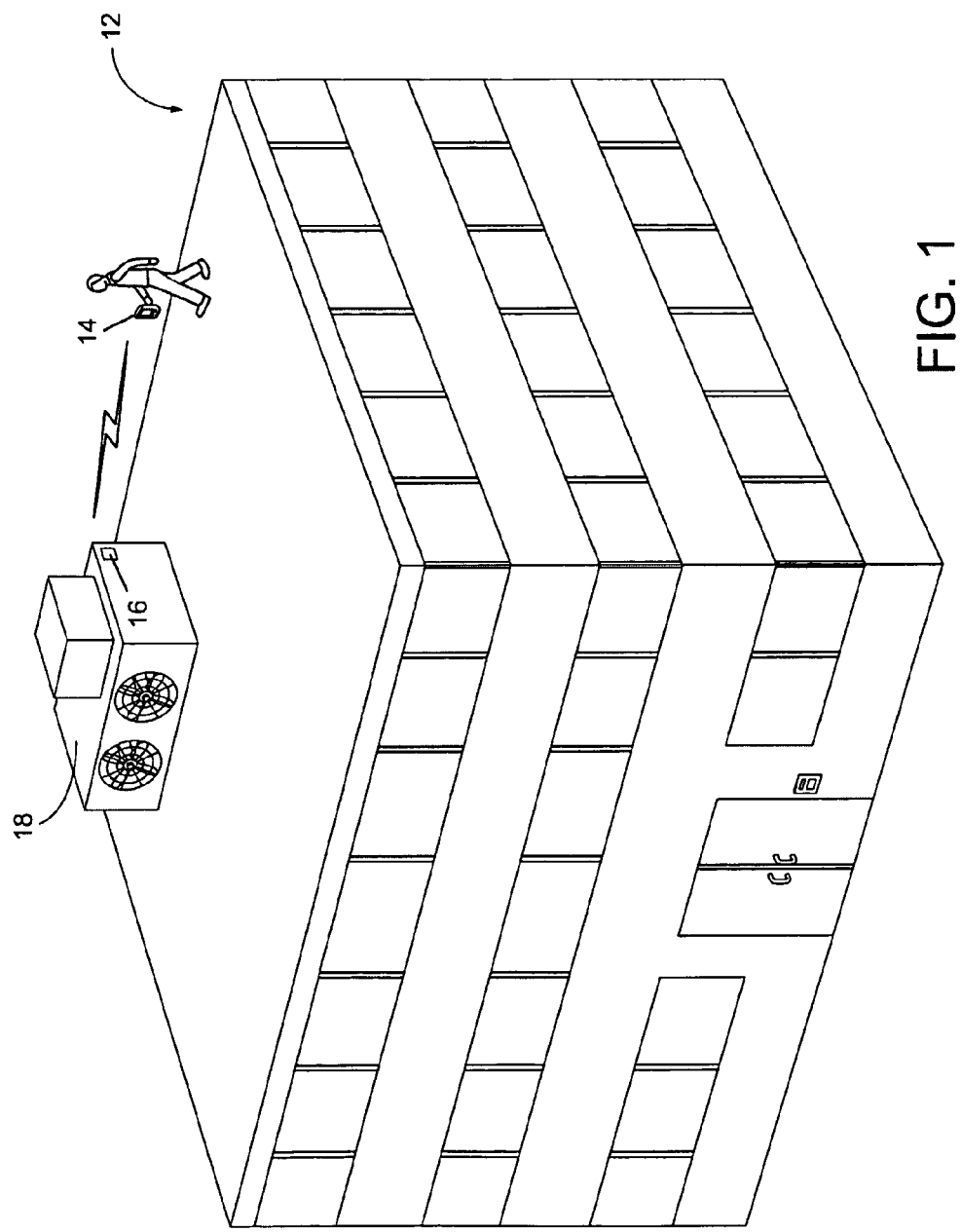

DEVICES, SYSTEMS, AND METHODS FOR COMMUNICATING WITH ROOFTOP AIR HANDLING UNITS AND OTHER HVAC COMPONENTS

BACKGROUND

The present disclosure generally relates to devices, systems, and methods for communicating with rooftop air handling units and other heating, ventilation, and air conditioning (HVAC) components. The present disclosure relates more specifically to configuring an HVAC component such as a rooftop air handling unit (AHU) for communication with a portable electronic device such as a mobile phone or a personal digital assistant (PDA).

SUMMARY

One embodiment relates to a device for communicating information from a controller for a rooftop air handling unit to a portable electronic device. The device includes a wire terminal for wiring to the controller and for receiving a signal comprising information from the controller. The device further includes a transceiver configured to wirelessly transmit the information to the portable electronic device. The device yet further includes a circuit coupled to the wire terminal and the transceiver. The circuit is configured to extract the information from the signal. The circuit is further configured to provide the information from the wire terminal to the transceiver.

Another embodiment relates to a device for communicating information from a controller for a rooftop air handling unit to a portable electronic device. The device includes a first transceiver for receiving a signal comprising information from the controller. The device further includes a second transceiver configured to wirelessly transmit the information to the portable electronic device. The device yet further includes a circuit coupled to the first transceiver and the second transceiver, the circuit configured to extract the information from the signal. The circuit is further configured to provide the information from the first transceiver to the second transceiver.

Another embodiment relates to a method for providing information from a controller for a rooftop air handling unit to a portable electronic device. The method includes the step of connecting a device to a wire terminal of the controller using a cable. The method further includes the step of receiving a signal comprising information at the device, the signal from the wire terminal of the controller over the cable. The method yet further includes extracting, at the device and using a circuit of the device, the information from the signal. The method further includes providing the information to a transceiver of the device. The transceiver is configured to form a wireless communications link with the portable electronic device and to provide the information to the portable electronic device.

Another embodiment relates to a controller for a rooftop air handling unit for communicating information from the controller to a portable electronic device. The controller includes an interface for providing control signals to and for receiving information from the rooftop air handling unit. The controller further includes a memory configured to store information regarding the rooftop air handling unit, the controller, or the rooftop air handling unit and the controller. The controller further includes a wire terminal configured to be wired to remote devices and to provide the information to the remote devices using a serial communications protocol. The controller further includes a radio frequency transceiver configured to be wirelessly connected to the portable electronic device and to provide the information to the portable electronic device using a wireless communications protocol.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 1 is a perspective view of a building having a rooftop unit (RTU) including or coupled to a controller for the RTU, according to an exemplary embodiment;

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, an HVAC component such as an AHU is configured to transmit information to a portable electronic device. According to various exemplary embodiments, the HVAC component includes a controller having a wire terminal to which an interface device is wired. A corresponding wire terminal of the interface device is configured to receive signals containing information regarding the HVAC component from the controller via the wired connection. The interface device extracts the information from the signals received at the wire terminal and provides the information to a transceiver of the interface device configured to wirelessly transmit the information to the portable electronic device. According to other various embodiments as will be described below, the HVAC component may be configured to directly and wirelessly communicate with the portable electronic device.

FIG. 1 is a perspective view of a building 12 having a plurality of devices capable of transmitting and/or receiving signals, according to an exemplary embodiment. Building 12 may include any number of floors, rooms, spaces, zones, and/or other building structures and areas. According to various exemplary embodiments, building 12 may be any area of any size or type, including an outdoor area.

Building 12 is shown to include a HVAC component such as a rooftop unit (RTU) 18. According to one exemplary embodiment, RTU 18 is an air handling unit (AHU) for use in controlling the climate of a part or the whole of building 12. RTU 18 includes one or more controllers 16. Controller 16 may generally control RTU 18 based on commands or setpoints received from external devices (e.g., a building management system) and/or may control RTU 18 based on one or more local control loops or calculations. According to various exemplary embodiments described herein, controller 16 may be accessed by and/or receive information from a portable electronic device 14.

Figure 2A:
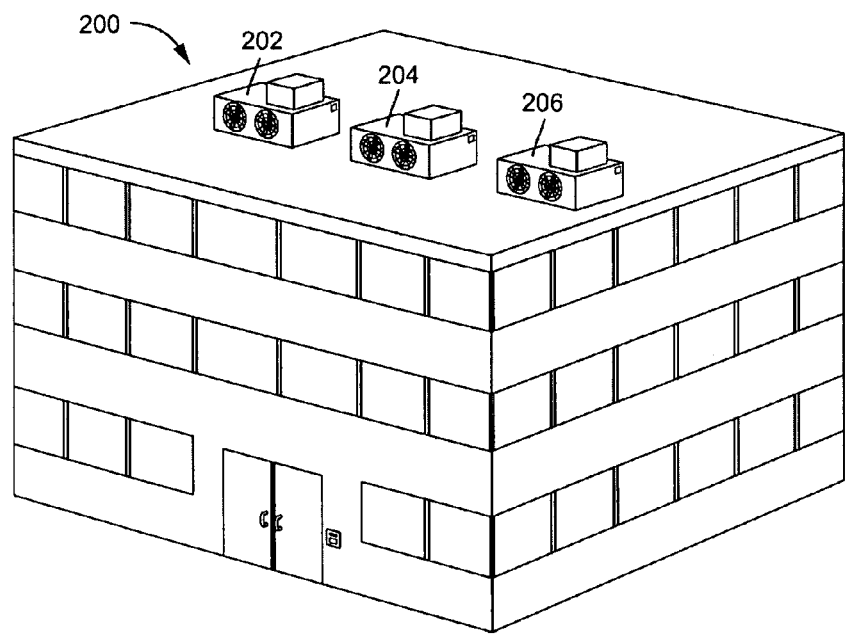
FIG. 2A is a perspective view of a building having a plurality of RTUs that may form or be a part of a wired or wireless network, according to an exemplary embodiment.
Figure 2B:
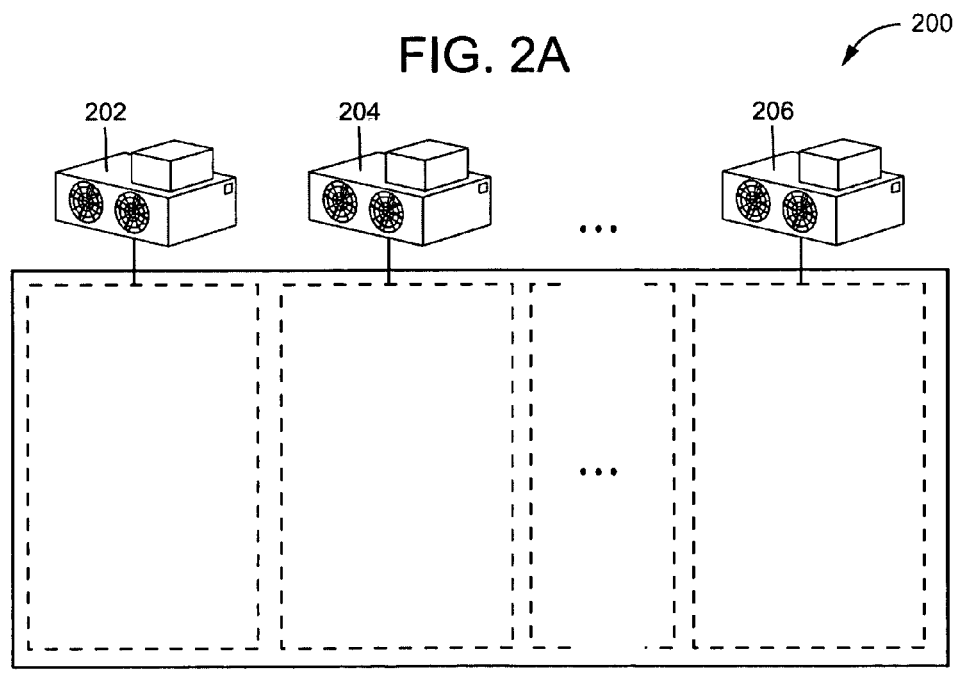
FIG. 2B is a schematic side view of a plurality of building zones served by the RTUs of FIG. 2A, according to an exemplary embodiment.

Referring to FIGS. 2A and 2B, building 200 (e.g., a warehouse, a retail store, an office building, etc.) is shown with multiple RTUs 202, 204, 206, according to an exemplary embodiment. RTUs 202, 204, 206 may be utilized to condition and/or control the whole of building 200 in parallel or different parts of building 200. In the embodiment of FIG. 2A, three RTUs are illustrated; according to various other exemplary embodiments, building 200 may contain greater or fewer RTUs. As illustrated in FIG. 2B, each RTU 202, 204, 206 may be assigned a zone (e.g., room, set of rooms, part of a room, floor, set of floors, part of a floor, etc.) of building 200 in order to configure one or more environment conditions of the zone (e.g., condition, cool, heat, ventilate, etc.).

Figure 3:
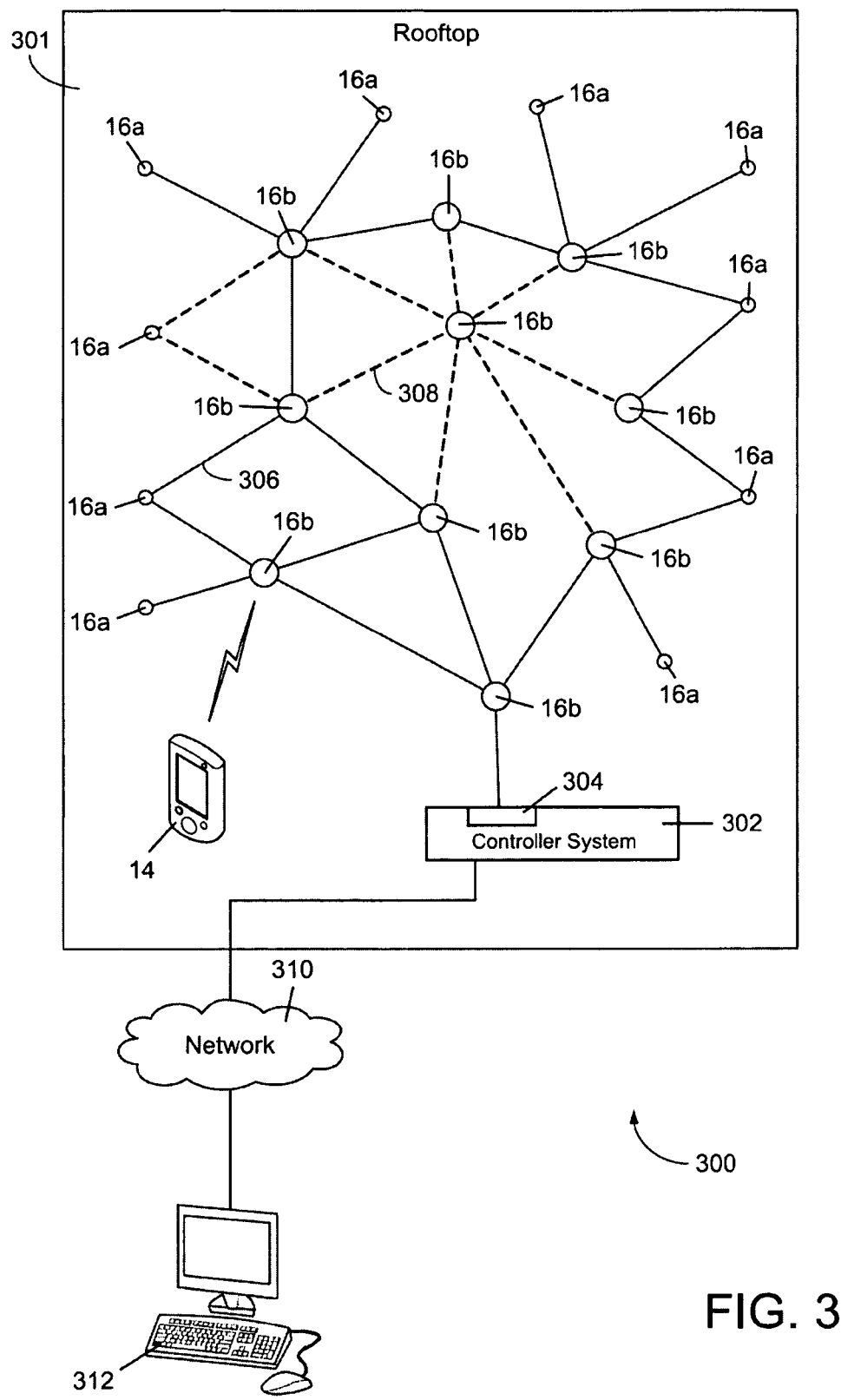
FIG. 3 is a block diagram of a mesh network formed by a plurality of HVAC components, including one or more RTUs, according to an exemplary embodiment.

In FIG. 3, a schematic view of a rooftop area 301 is illustrated to include a plurality of devices 16a, 16b (e.g., RF-enabled devices) and a controller system 302. Devices 16a, 16b may be controllers associated with an RTU, controllers associated with other HVAC components, or otherwise. Controller system 302 may connect to a network 310 and a server 312 (e.g., a building automation system controller, a network automation engine, an enterprise server, etc.) elsewhere in the building and may be configured to manage and/or to provide control signals (e.g., setpoints) to the plurality of devices 16a, 16b. According to various exemplary embodiments, one or more of devices 16a, 16b are configured to wirelessly communicate with a portable electronic device 14 brought within communication proximity.

As illustrated in FIG. 3, devices 16a, 16b are arranged according to a mesh network topology to form a mesh network 300. Mesh network 300 may be formed by one or more RTUs (or RTU controllers) and various other dampers, sensors, controllers, user interfaces, and the like of the rooftop or building. According to other exemplary embodiments, the HVAC components described herein may be connected according to another type of network topology.

Devices 16a, 16b are interconnected by connections (e.g., RF connections) 306 (displayed as solid lines on FIG. 3). Connections may be disabled (or otherwise unavailable) for various reasons (displayed as dashed lines on FIG. 3) and are shown by connections 308. As a result, some devices 16a (devices without a solid line connection as illustrated in FIG. 3) may temporarily be disconnected from mesh network 300, but are configured to automatically connect (or reconnect) to any other suitable device 16a within range. Other devices 16b may be disconnected from mesh network 300 without being able to connect to another device 16a.

According to an exemplary embodiment, devices 16a, 16b of FIG. 3 are ZigBee compatible devices. ZigBee is the name of a specification related to low cost and low power digital radios. The ZigBee specification describes a collection of high level communication protocols based on the IEEE 802.15.4 standard. A ZigBee compatible device is a device generally conforming to ZigBee specifications and capable of existing or communicating with a ZigBee network. In other exemplary embodiments, devices 16a, 16b could be any kind of radio frequency communicating wireless device including, but not limited to, Bluetooth devices, 802.11 (Wi-Fi) based devices, WiMax devices, and the like. According to an exemplary embodiment, devices 16a, 16b may be any type of ZigBee device including ZigBee coordinators, ZigBee routers, ZigBee end devices, etc. ZigBee coordinators and routers are generally RF-enabled devices that can act as intermediate routers and may relay data to and from other devices on the network. Conversely, ZigBee end devices may not be able to relay data from other devices back onto the network. Still referring to FIG. 3, mesh network 300 may include a number of devices 16a, 16b that are either full function devices or reduced function devices. For example, devices 16a that might be end devices or reduced function devices are shown with one connection (and may only have one possible connection) in mesh network 300. Additionally, devices 16b might be coordinators, routers or full function devices that relay information to and from multiple devices 16a, 16b on mesh network 300 (illustrated by a node with multiple connections). Devices 16a, 16b may be configured to determine a shortest path or otherwise exemplary path in which to send data on mesh network 300.

Figure 4:
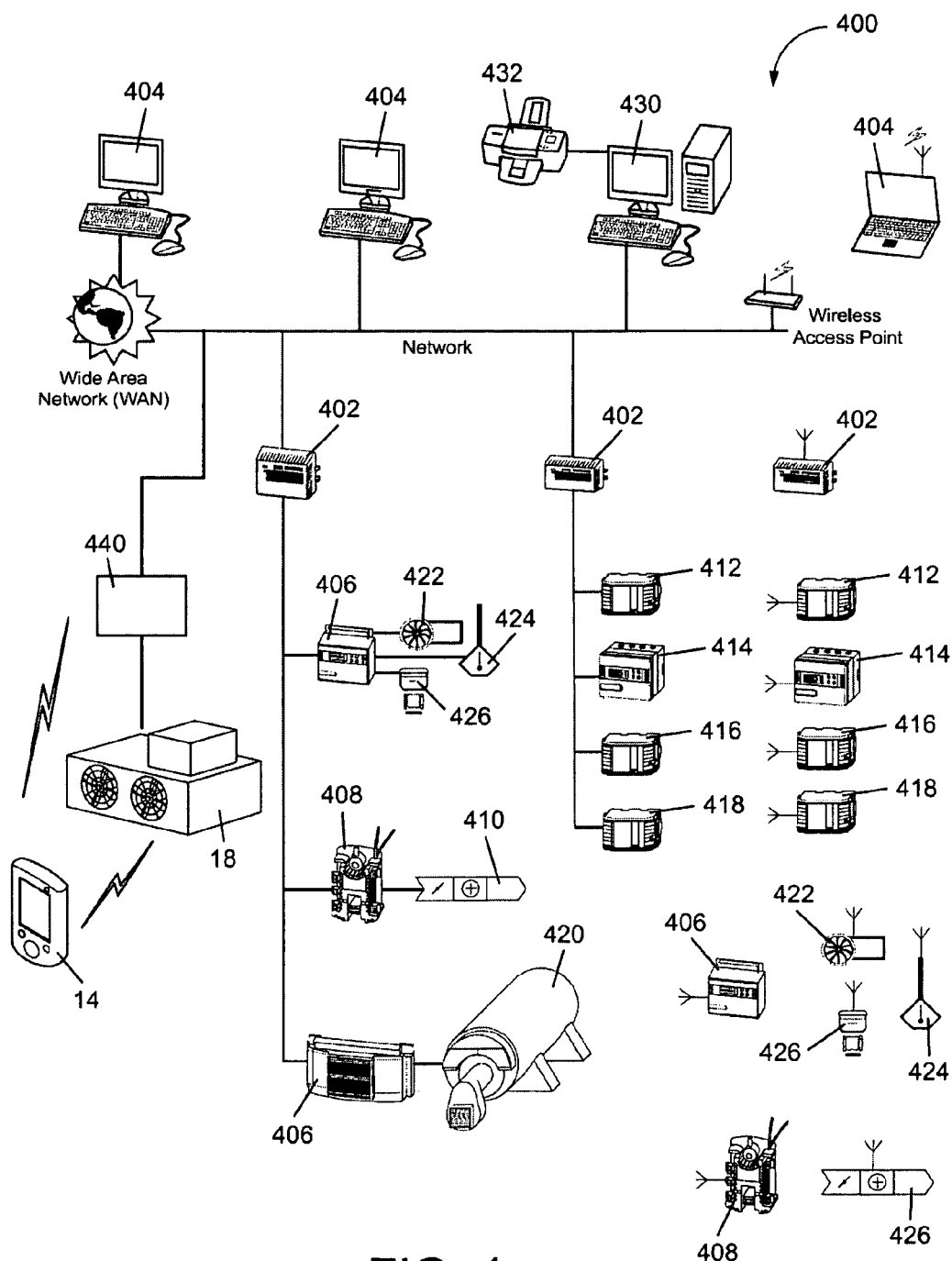
FIG. 4 is a schematic diagram of a building automation system (BAS) having an RTU (and/or RTU controller) with which a portable electronic device is configured to wirelessly communicate, according to an exemplary embodiment.

Referring to FIG. 4, a schematic diagram of a building automation system (BAS) 400 is shown, according to an exemplary embodiment. BAS 400 as illustrated and discussed is an example of a building automation system that may be used in conjunction with the systems and methods of the present disclosure; however, other building automation systems may be used as well. Building automation systems are, in general, hardware and/or software systems configured to control, monitor, and manage equipment in or around a building or building area. BAS equipment can include a heating, ventilation, and air conditioning (HVAC) system, a security system, a lighting system, a fire alerting system, an elevator system, another system that is capable of managing building functions, or any combination thereof.

BAS 400 is shown to include one or more supervisory controllers (e.g., a network automation engine (NAE)) 402 connected to a proprietary or standard communications network such as an IP network (e.g., Ethernet, WiFi, ZigBee, Bluetooth, etc.). Supervisory controllers 402 may support various field-level communications protocols and/or technology, including various Internet Protocols (IP), BACnet over IP, BACnet Master-Slave/Token-Passing (MS/TP), N2 Bus, N2 over Ethernet, Wireless N2, LonWorks, ZigBee, and any number of other standard or proprietary field-level building management protocols and/or technologies. Supervisory controllers 402 may include varying levels of supervisory features and building management features. The user interface of supervisory controllers 402 may be accessed via terminals 404 (e.g., web browser terminals) capable of communicably connecting to and accessing supervisory controllers 402. For example, FIG. 4 shows multiple terminals 404 that may variously connect to supervisory controllers 402 or other devices of BAS 400. For example, terminals 404 may access BAS 400 and connected supervisory controllers 402 via a WAN, an Internet location, a local IP network, or via a connected wireless access point. Terminals 404 may also access BAS 400 and connected supervisory controllers 402 to provide information to another source, such as printer 432.

Supervisory controllers 402 may be connected to any number of BAS devices. The devices may include, among other devices, devices such as field equipment controllers (FECs) 406 such as field-level control modules, variable air volume modular assemblies (VMAs) 408, integrator units, room controllers 410, 412 (e.g., a variable air volume (VAV) device or unit such as a VAV box), other controllers 414, unitary devices 416, zone controllers 418 (e.g., an air handling unit (AHU) controller), boilers 420, fan coil units 422, heat pump units 424, unit ventilators 426, expansion modules, blowers, temperature sensors, flow transducers, other sensors, motion detectors, actuators, dampers, heaters, air conditioning units, etc. These devices may generally be controlled and/or monitored by supervisory controllers 402. Data generated by or available on the various devices that are directly or indirectly connected to supervisory controllers 402 may be passed, sent, requested, or read by supervisory controllers 402 and/or sent to various other systems or terminals 404 of BAS 400. The data may be stored by supervisory controllers 402, processed by supervisory controllers 402, transformed by supervisory controllers 402, and/or sent to various other systems or terminals 404 of the BAS 400. As shown in FIG. 4, the various devices of BAS 400 may be connected to supervisory controllers 402 with a wired connection or with a wireless connection.

Still referring to FIG. 4, an enterprise server 430 (e.g., an application and data server (ADS)) is shown, according to an exemplary embodiment. Enterprise server 430 is a server system that includes a database management system (e.g., a relational database management system, Microsoft SQL Server, SQL Server Express, etc.) and server software (e.g., web server software, application server software, virtual machine runtime environments, etc.) that provide access to data and route commands to BAS 400. For example, enterprise server 430 may serve user interface applications. Enterprise server 430 may also serve applications such as Java applications, messaging applications, trending applications, database applications, etc. Enterprise server 430 may store trend data, audit trail messages, alarm messages, event messages, contact information, and/or any number of BAS-related data. Terminals may connect to enterprise server 430 to access the entire BAS 400 and historical data, trend data, alarm data, operator transactions, and any other data associated with BAS 400, its components, or applications. Various local devices such as printer 432 may be attached to components of BAS 100 such as enterprise server 430.

Referring still to FIG. 4, an RTU 18 is shown coupled to a controller 440. Controller 440 is shown as coupled to the network of BAS 400 but according to various embodiments may be coupled to any other network link supervisory controller, field bus, or the like of the BAS. RTU 18 communicates with controller 440 to provide a communication path between RTU 18 and other components of BAS 400 (e.g., supervisory controllers, wired devices, wireless devices, etc.). Portable electronic device 14 is shown wirelessly communicating with RTU 18 and/or controller 440. Various exemplary embodiments of RTU 18 are shown in greater detail in subsequent figures.

Figure 5:
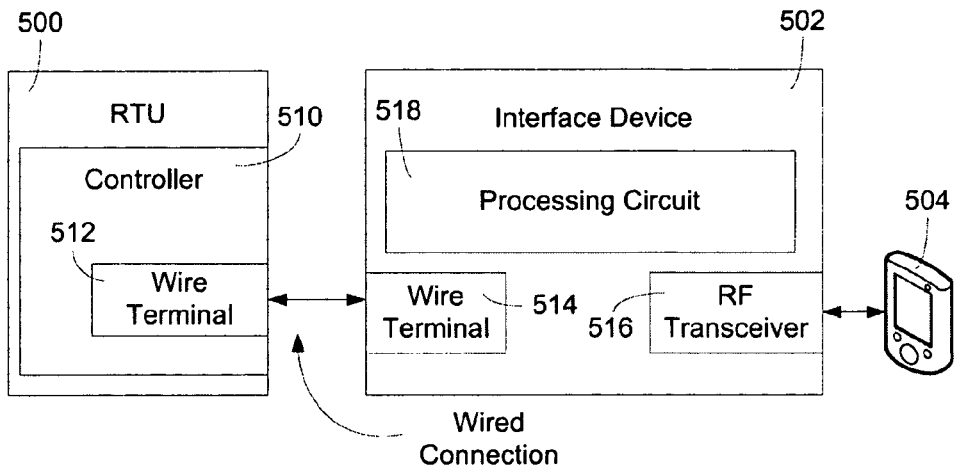
FIG. 5 is a block diagram of a system for exchanging communications between an RTU and a portable electronic device using an intermediate interface device, according to an exemplary embodiment.
Figure 6:
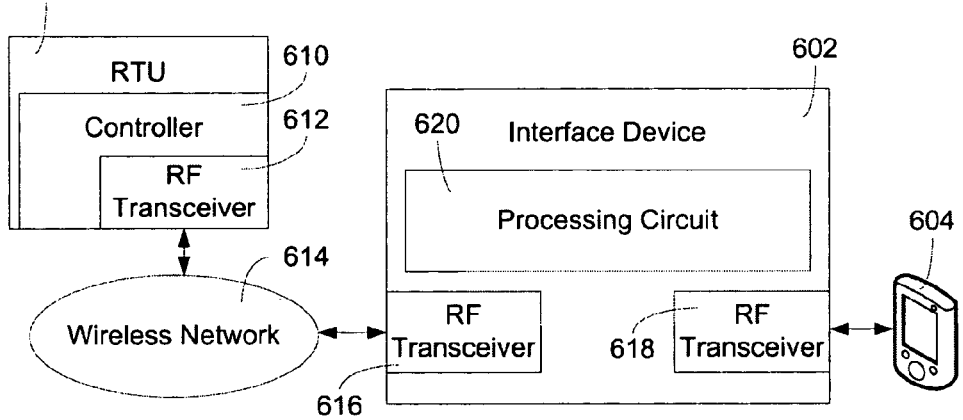
FIG. 6 is a block diagram of a system for exchanging communications between an RTU and a portable electronic device using an intermediate interface device, according to another exemplary embodiment.
Figure 7:
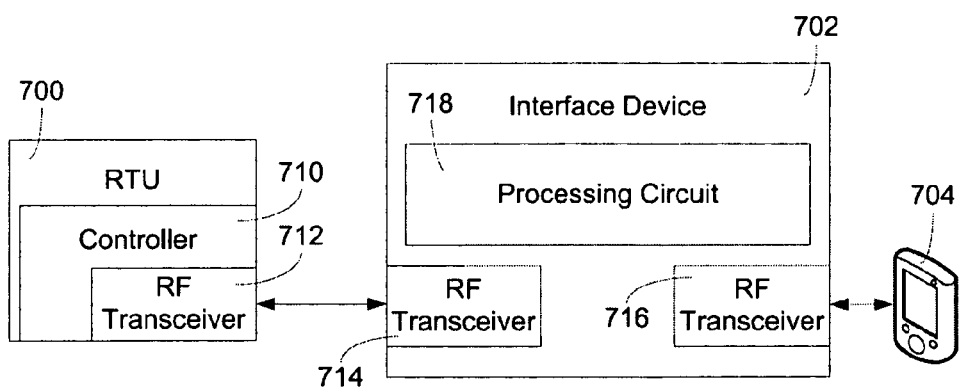
FIG. 7 is a block diagram of a system for exchanging communications between an RTU and a portable electronic device using an intermediate interface device, according to yet another exemplary embodiment.

Referring generally to FIGS. 5-7, systems are shown that include an RTU connected to an interface device via a wired or wireless connection. The interface device also wirelessly connects to a portable electronic device and provides the portable electronic device with information from the RTU. The portable electronic device may therefore access RTU information without physically and directly connecting to the RTU. According to an exemplary embodiment, a general purpose portable electronic device (e.g., a commercially available PDA or mobile phone) may advantageously be used to receive information from the RTU, in lieu of a specialized BAS component or device, in order to diagnose, manage or control the RTU. For example, a technician may use his or her own portable electronic device to analyze, check, or otherwise monitor RTU performance and information.

Referring now to FIG. 5, a block diagram of a system including an RTU 500, an interface device 502, and a portable electronic device 504 is shown, according to an exemplary embodiment.

RTU 500 is shown to include or be coupled to a controller 510 having a wired communications terminal 512. Wired communications terminal 514 of interface device 502 is configured form a wired communications link with wired communications terminal 512. According to an exemplary embodiment, a wired serial connection is formed between terminals 512, 514 (e.g., interface device 502 may connect directly with RTU 500) and allows interface device 502 to receive a signal from RTU 500 including or representing information about RTU 500.

According to an exemplary embodiment, wire terminal 514 may be an RS-485 terminal, an EIA-485 terminal, a TIA-485-A terminal, or another terminal. According to yet another embodiment, wire terminal 514 is a USB terminal and transceiver 516 is compatible with a wireless USB protocol. Wire terminal 514 can be configured to communicate using one or more standard or proprietary specifications or protocols. For example, wire terminal 514 can be configured to communicate using a BACnet protocol, a Modbus protocol, a Metasys N2 protocol or any other standard or proprietary HVAC, network, or building automation system protocol or specification. According to various other exemplary embodiments, wire terminal 514 can be configured differently and/or for compatibility with any analog and/or digital (e.g., optical, digital over coax, etc.) wired communications specification.

Interface device 502 is shown to include an RF transceiver 516 for communicating wirelessly with portable electronic device 504. Interface device 502 is configured to provide information received from RTU 500 to device 504 via RF transceiver 516. Interface device 502 includes processing circuit 518 that may be communicably coupled (e.g., directly, indirectly) to wired communications terminal 514 and RF transceiver 516. Processing circuit 518 may be configured to receive a signal from wired terminal 514, interpret the signal to extract information, and to provide the information in a format compatible with RF transceiver 516 for transmission to portable electronic device 504.

Referring now to FIG. 6, a block diagram of a system including an RTU 600 and an interface device 602 is shown, according to another exemplary embodiment. Interface device 602 is shown to include two RF transceivers 616, 618, one configured to connect to RTU 600 via wireless network 614 and another configured to connect to portable electronic device 604, respectively.

RTU 600 includes a controller 610 including a transceiver 612 configured to wirelessly communicate with wireless network 614. Wireless network 614 may be a mesh network and controller 610 may be a node of the mesh network. Transceiver 616 of interface device 602 may also wirelessly connect to network 614 and receive a signal from RTU 600 via network 614. Processing circuit 620 may then receive the signal and provide RF transceiver 618 with information extracted or otherwise derived from the signal.

Referring to FIG. 7, a block diagram of a system including an RTU 700 and interface device 702 is shown, according to yet another exemplary embodiment. Transceiver 712 of controller 710 is configured to directly wirelessly communicate with transceiver 714 of interface device 702. Interface device 702 includes processing circuit 718 configured to receive a signal from transceiver 714, interpret information from the signal, and to provide the information in a format compatible with RF transceiver 716 and for transmission to portable electronic device 704.

According to an exemplary embodiment, the RF transceivers of FIGS. 5-7 may be configured to communicate according to a Bluetooth compatible protocol, Zigbee protocol, an IEEE 802.11 protocol, an IEEE 802.15 protocol, or another any other protocol.

Figure 8:
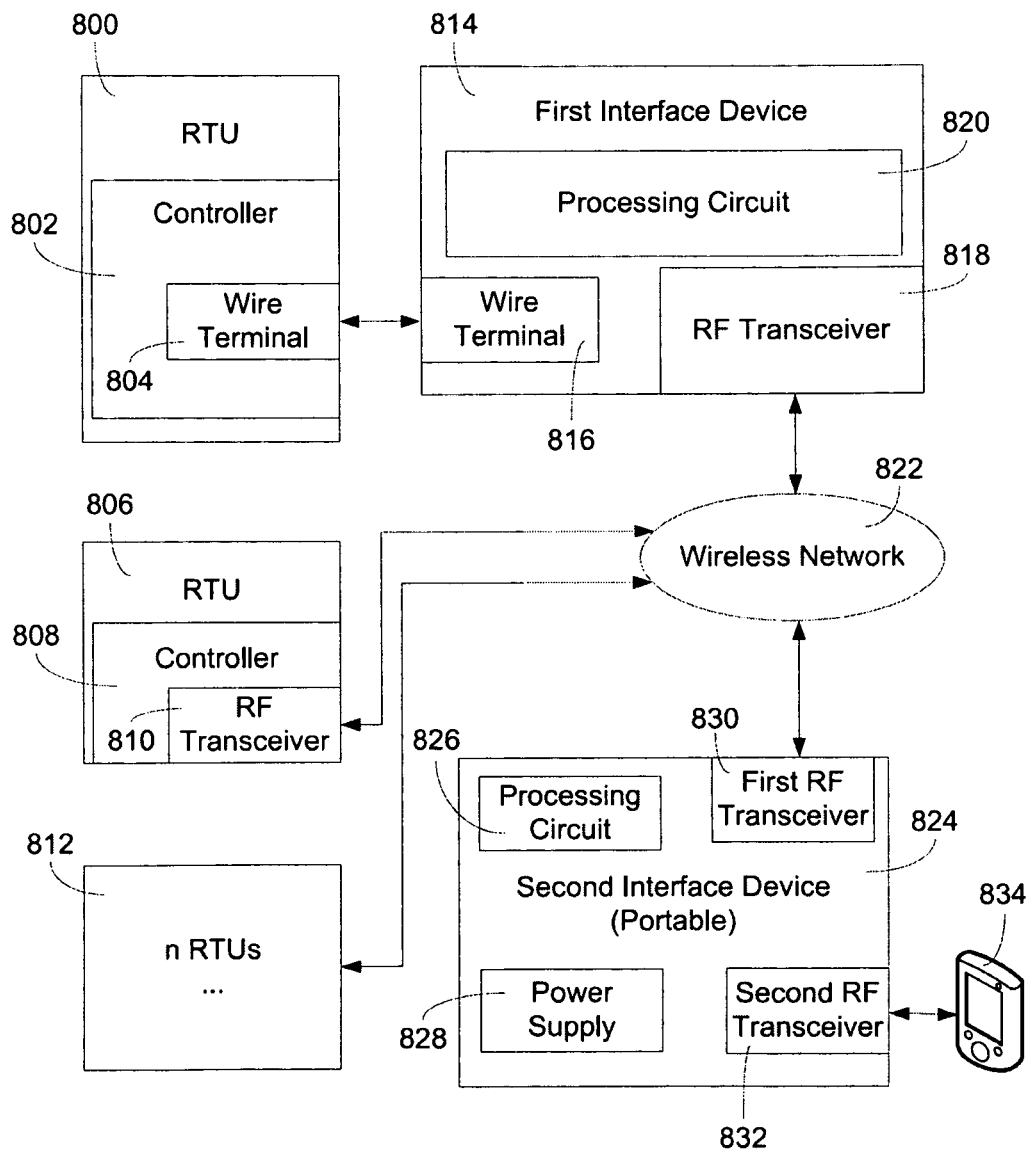
FIG. 8 is a block diagram of a system for exchanging communications between an RTU and a portable electronic device using two intermediate interface devices, according to an exemplary embodiment.

Referring now to FIG. 8, a block diagram of a system using multiple interface devices 814, 824 to facilitate communications between RTU 800 and portable electronic device 834 is shown, according to an exemplary embodiment. One or more RTUs (e.g., RTU 800) connect to a first interface device 814 configured to serve as a bridge between RTU 800 and second interface device 824. The connection may be a wired connection formed between wire terminal 804 of controller 802 and wire terminal 816. First interface device 814 further includes RF transceiver 818 and processing circuit 820 which have the same general functionality as described in FIGS. 5-7. First interface device 814 is configured to allow RTU 800 to send information to and/or receive information from wireless network 822. Other RTUs (e.g., RTUs 806, 812) may connect to wireless network 822 via an embedded transceiver (e.g., transceiver 810 of controller 808), another interface device such as first interface device 814, or otherwise. According to an exemplary embodiment, wireless network 822 may be the mesh network 300 of FIG. 3 and the controllers of RTUs 800, 806, 812 may be devices 16a, 16b of FIG. 3.

Wireless network 822 may be connected to a second interface device 824 via a first RF transceiver 830. Second interface device 824 may receive signals and/or information from all RTUs (e.g., RTUs 800, 806, 812) connected to network 822 or first interface device 814. Second interface device 824 may include a processing circuit 826 to accept the signal received by first RF transceiver 830 and to provide second RF transceiver 832 with information to transmit to device 834.

According to an exemplary embodiment, second interface device 824 is a portable device configured to communicate wirelessly with wireless network 822. Second interface device 824 includes a power supply 828 (e.g., a battery) for providing power to second interface device 824, for providing power to portable electronic device 834, for charging portable electronic device 834, and the like.

Figure 9:
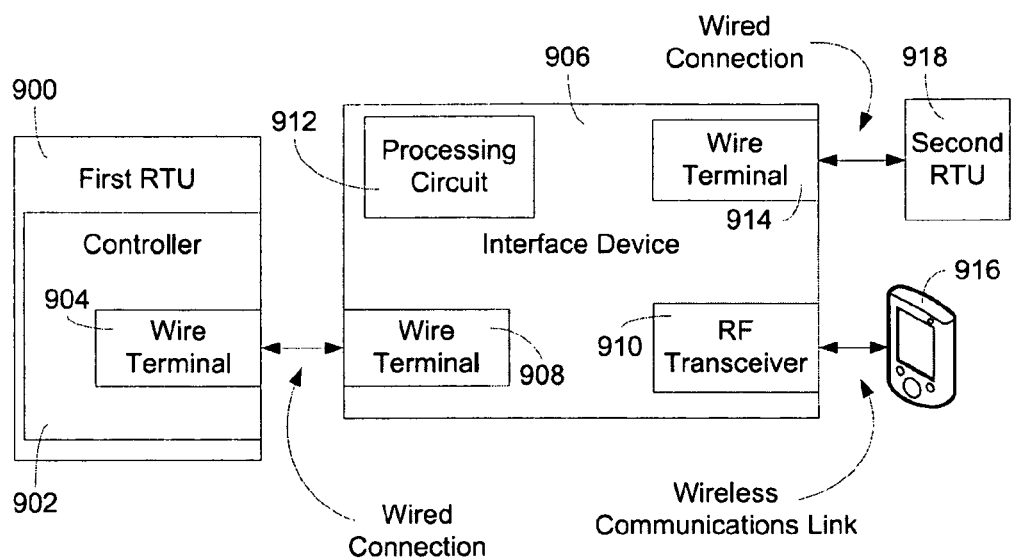
FIG. 9 is a block diagram of a system including an "in-line" interface device configured to couple two or more RTUs while allowing a wireless communications link to be formed with a portable electronic device, according to an exemplary embodiment.

Referring to FIG. 9, a block diagram of a system is shown to include an "in-line" interface device 906 configured to couple (via a wired connection) RTUs 900, 918 while allowing a wireless communications link to be formed between at least one of the RTUs and a portable electronic device 916, according to an exemplary embodiment. According to the exemplary embodiment shown in FIG. 9, interface device 906 may include a wire terminal for each RTU coupled to interface device 906 to form a wired connection with the RTU. According to other exemplary embodiments, interface device 906 may include one wire terminal for connecting to a local RTU (or RTU controller) and another wire terminal for connecting to a network of other HVAC devices or of a series of RTUs or RTU controllers. Interface device 906 includes a processing circuit 912 configured to process signals received via wire terminals 908, 914. Processing circuit 912 is further configured to provide RF transceiver 910 with an output for portable electronic device 916 including information regarding RTU 900 or RTU 918. According to an exemplary embodiment, RF transceiver 910 forms a wireless communications link with portable electronic device 916 and communicates to the output via the wireless communications link. According to an exemplary embodiment, interface device 906 and/or processing circuit 912 may be configured to specifically request information from a connected RTU or may be configured to recognize information from the RTU and meant for the portable electronic device. According to various other exemplary embodiments, interface device 906 "listens" to communications as the interface device relays the communications between first RTU 900 and second RTU 918, extracts information from the communications, and provides the information to RF transceiver 910 for wireless transmission to portable electronic device 916. According to an exemplary embodiment, interface device 906 can be configured be installed between first RTU 900 and second RTU 918 without changing a configuration parameter or otherwise affecting the configuration or performance of RTUs 900 and 918.

Figure 10:
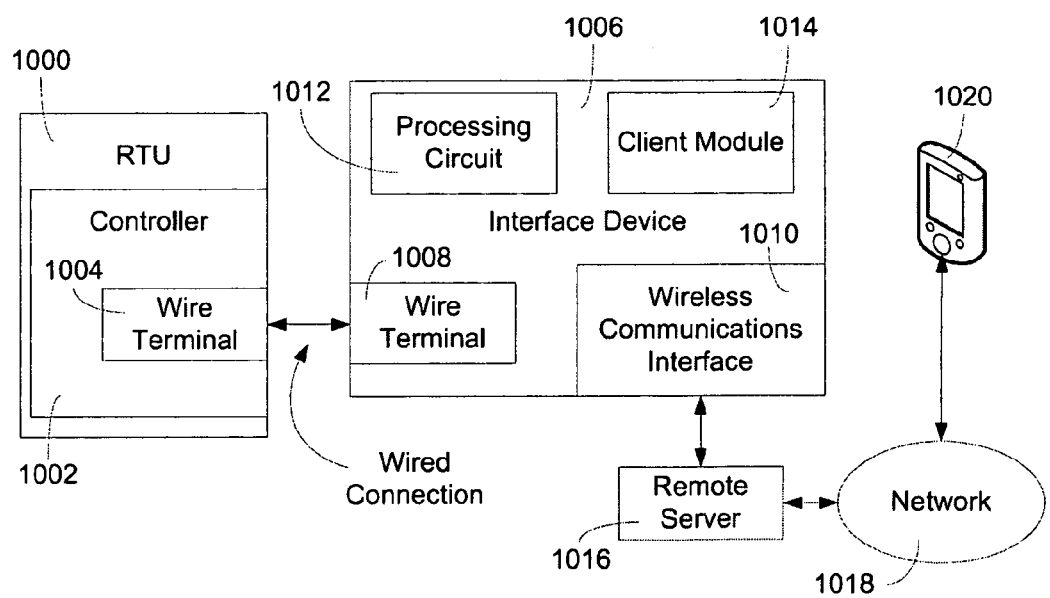
FIG. 10 is a block diagram of an RTU coupled to an interface device configured to connect to a portable electronic device via a remote server and a network, according to an exemplary embodiment.

Referring to FIG. 10, a block diagram of an RTU 1000 and an interface device 1006 connected to portable electronic device 1020 via a remote server 1016 and network 1018 is shown, according to an exemplary embodiment. RTU 1000 (or more than one RTU) may connect to interface 1006 via a wired connection between wire terminal 1008 of device 1006 and wire terminal 1004 of controller 1002 of RTU 1000. Interface device 1006 is shown to include a processing circuit 1012 for processing a signal received from RTU 1000. Interface device 1006 further includes wireless communications interface 1010 capable of communicating with a remote server 1016. Remote server 1016 may receive RTU information from interface device 1006. Network 1018 may be connected to remote server 1016, and portable electronic device 1020 may access the RTU information from remote server 1016 via network 1018.

Device 1020 may be configured to connect to network 1018 and to receive information from RTU 1000 without directly connecting to RTU 1000 or interface device 1002. Interface device 1006 is further shown to include client module 1014. Client module 1014 may be configured as a client relative to remote server 1016 and configured to engage in client-server communications with remote server 1016. Remote server 1016 can be configured to compile or archive information received from RTU 1000 via interface device 1006 on a request basis, a push basis, a regular basis, or otherwise. Further, remote server 1016 may be configured to interpret requests received from portable electronic device 1020 and direct the requests to interface device 1006. Client module 1014 may be configured to interpret the requests and to handle the requests according to the client-server protocol existing with remote server 1016. Handling the requests may include requesting information from RTU 1000 or sending commands to RTU 1000 via wire terminal 1008.

Figure 11:
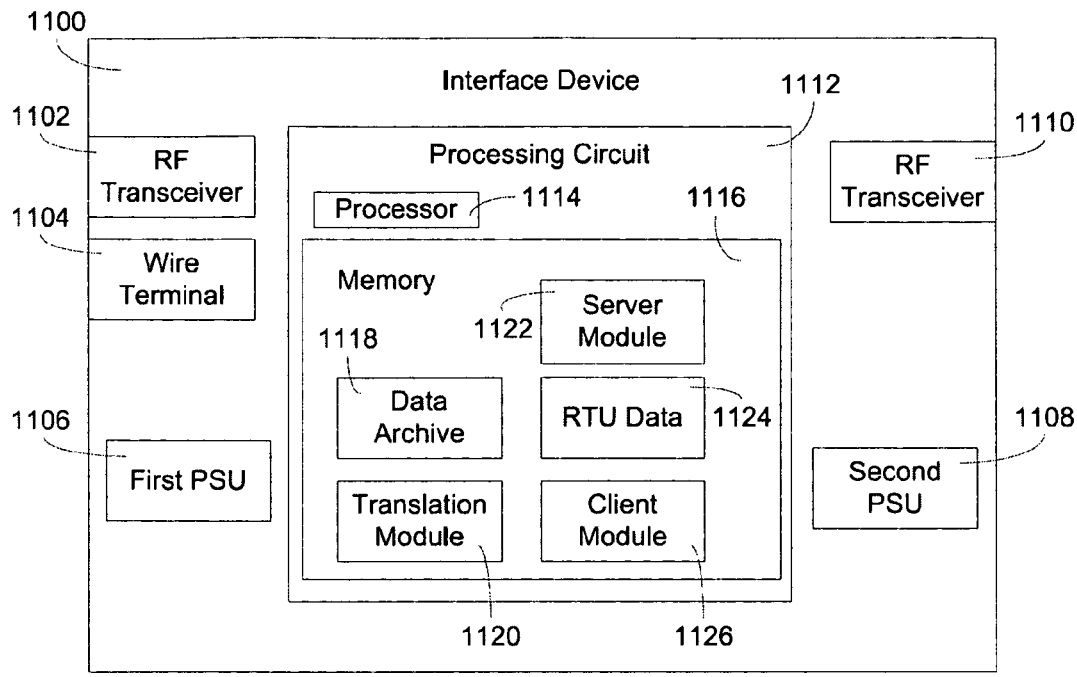
FIG. 11 is a detailed block diagram of an interface device, according to an exemplary embodiment.

Referring to FIG. 11, a detailed block diagram of interface device 1100, which may be an interface device of any one or more of the embodiments described herein, is shown, according to an exemplary embodiment. Interface device 1100 is shown to include RF transceiver 1102, wire terminal 1104, and RF transceiver 1110. Wire terminal 1104 may be an RS-485 terminal, an EIA-485 terminal, or a TIA-485-A terminal, according to an exemplary embodiment. According to another exemplary embodiment, wire terminal 1104 may be a universal serial bus (USB) terminal. Transceiver 1102 and/or transceiver 1110 may be compatible with a wireless USB protocol, a Zigbee protocol, a Bluetooth protocol, a WiFi protocol, a mobile phone protocol, and/or any other RF-based protocol.

Interface device 1110 further includes a first power supply unit (PSU) 1106 and second PSU 1108. According to one exemplary embodiment, interface device 1100 may be "plugged into" a power source at PSU 1106. PSU 1108 may be a battery source for portability of interface device 1110 or to serve as a back-up source of power for interface device 1110 should the grid-based power source fail.

Processing circuit 1112 of device 1100 includes a processor 1114 and memory 1116. Processor 1114 may be a general purpose processor, an application specific integrated circuit (ASIC), a circuit containing one or more processing components, a group of distributed processing components, or other hardware configured for processing. Memory 1116 (e.g., memory unit, memory device, storage device, RAM, ROM, etc.) may generally be one or more devices for storing data and/or computer code for completing and/or facilitating the various processes described in the present disclosure when executed by processor 1114. Memory 1116 may include volatile memory and/or non-volatile memory. Memory 1116 may include database components, object code components, script components, and/or any other type of information structure for supporting the various activities described in the present disclosure. For example, memory 1116 and particularly data archive 1118 of memory 1116, may be configured to store present or historical data relating to RTU performance, settings, status, diagnostics, or other information.

Translation module 1120 of memory 1116 may be configured to receive a signal from a terminal or transceiver of device 1100. The received signal may include information regarding one or more RTUs associated with device 1100. Translation module 1120 may be generally configured to translate the signal or the information to another format or protocol. For example, translation module 1120 may receive a signal with information from wire terminal 1104 and translate the information from a format compatible with wire terminal 1104 to a format compatible with RF transceiver 1110. RF transceiver 1110 may then receive the translated information and transmit the information to a portable electronic device.

According to an exemplary embodiment, the translation performed by translation module 1120 includes interpreting the information according to a first data communications protocol and using the interpretation to reform the information according to a second data communications protocol. For example, translation module 1120 may interpret the information according to a first data communications protocol such as a BACnet protocol, a Modbus protocol, a Metasys N2 protocol, or another protocol. Translation module 1120 may then reform the information according to the second data communications protocol. According to one exemplary embodiment, the second data communications protocol is a wireless application protocol (WAP), and the information may be described according to an XML language, an XHTML language, a WML language, or another markup language. According to another exemplary embodiment, the second data communications protocol is an HTTP protocol and the information may be described according to an XML, XHTML, HTML, or other language.

The information translated by translation module 1120 may be related to various conditions, measurements, and other data from an RTU. Information may include operational status information of the RTU, alert information, sensor information, naming information, historical information, diagnostics information, setpoint information, or other related information.

RTU data 1124 of memory 1116 may be a database, data store, or other component configured to store and provide data relating to RTUs connected to interface device 1100. Information may be received from an RTU and stored in RTU data 1124. For example, RTU data may include operating data such as temperature, pressure, power, warning messages, etc. According to an exemplary embodiment, an RTU may send such operating data for finite periods of time during operation and/or after a shutdown of the RTU. The data may then be stored in RTU data 1124 for a specified period of time, indefinitely, or until space is needed.

Server module 1122 of memory 1116 can be configured to receive requests from a client module installed on a portable electronic device, an RTU controller, or any other remote device. Server module 1122 may also or alternatively be configured to request information from the client modules according to a pre-established client-server protocol. For example, the portable electronic device may include client software (e.g., browser software, XML parsing software, messaging software, etc.) that can receive and interpret messages transmitted to it from server module 1122.

Client module 1126 of memory 1116 can be a client module configured as client module 1014 described above with reference to FIG. 10 or otherwise. For example, client module 1126 can be a client module configured to respond to communicate with a BAS server (e.g., a server module residing in a supervisory controller or an enterprise controller). According to other exemplary embodiments, client module 1126 can be a client module configured to communicate with a server module that is a part of a portable electronic device. For example, the portable electronic device may include server software that, once it is connected to client module 1126, commands client module 1126 in a variety of ways. According to an exemplary embodiment, client module 1126 and one of RF transceivers 1102 and 1110 may be configured to scan for nearby portable electronic devices. When a nearby device is found, the interface device may pair with the portable electronic device (assuming authority is granted by the portable electronic device), and the client module may establish itself as a client of server software included in the portable electronic device.

Figure 12:
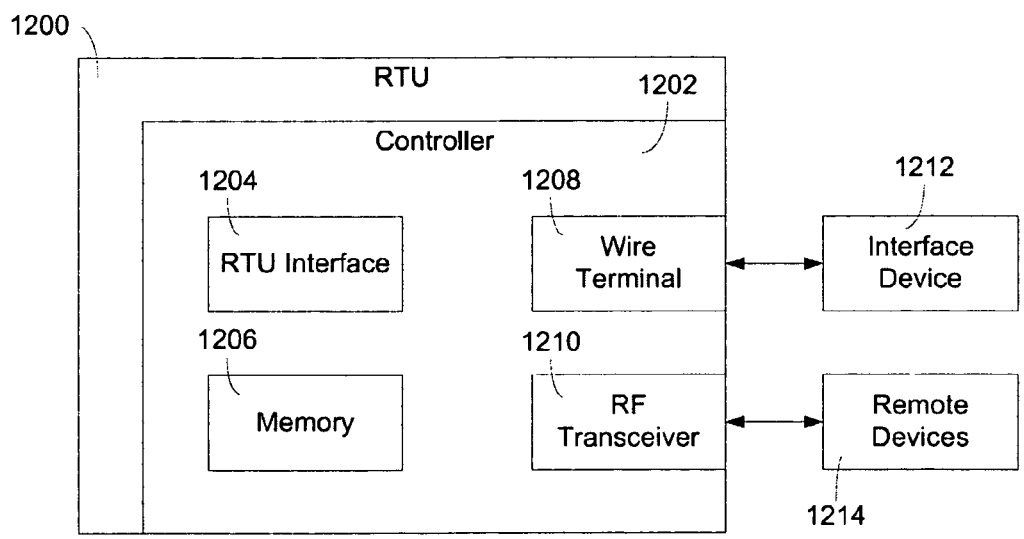
FIG. 12 is a block diagram of a controller for an RTU configured to enable direct wireless communications with an interface device, according to an exemplary embodiment.

Referring to FIG. 12, a block diagram of a controller 1202 of an RTU 1200 connected to an interface device 1212 is shown, according to an exemplary embodiment. Controller 1202 is shown as integrated with RTU 1200, but controller 1202 may instead be connected to RTU 1200 (e.g., spaced from the RTU, coupled to the exterior of the RTU, etc.). Controller 1202 may generally include an RTU interface 1204 and a memory 1206. RTU interface 1204 is configured to provide control signals to and/or receive information (e.g., feedback) from RTU 1200. Memory 1206 is configured to store information from RTU 1200 and/or controller 1202. Controller 1202 further includes wire terminal 1208 for communicating with interface device 1212 (e.g., one or more of the interface devices described above having a wire terminal). Controller 1202 further includes RF transceiver 1210 capable of communicating with various other remote devices 1214 (e.g., interface devices having an RF transceiver, portable electronic devices having a transceiver, wireless sensors, a wireless mesh network, other RTUs, etc.).

In the embodiment of FIG. 12, controller 1202 associated with RTU 1200 may connect directly with remote devices 1214 such as a portable electronic device without the use of an interface device or other device.

Figure 13:
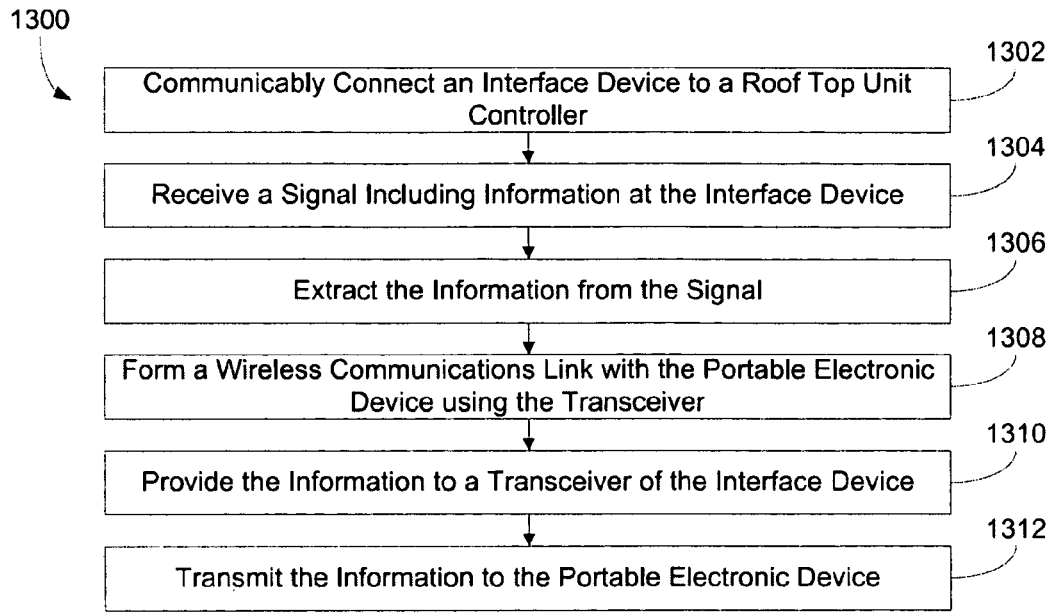
FIG. 13 is a flow chart of a process for communicating information from an RTU to a portable electronic device, according to an exemplary embodiment.

Referring to FIG. 13, a flow chart of a process 1300 for transmitting information from an RTU to a portable electronic device is shown, according to an exemplary embodiment. An interface device may communicably connect to a RTU controller (step 1302) (e.g., by connecting a wire terminal of the RTU controller to a wire terminal of the interface device). A signal including information from the RTU controller may be received by the interface device (step 1304) via a wire connection. The interface device may extract the information from the signal (step 1306) (e.g., by interpreting a wire-based building automation system protocol).

The interface device may form a wireless communications link with a portable electronic device (step 1308) using an RF transceiver of the interface device. The extracted information of step 1306 may then be provided to the transceiver (step 1310) and the information may be transmitted to the portable electronic device (step 1312) by the transceiver. According to an exemplary embodiment, process 1300 may generally correspond to a system such as shown in FIGS. 5-7.

Figure 14:
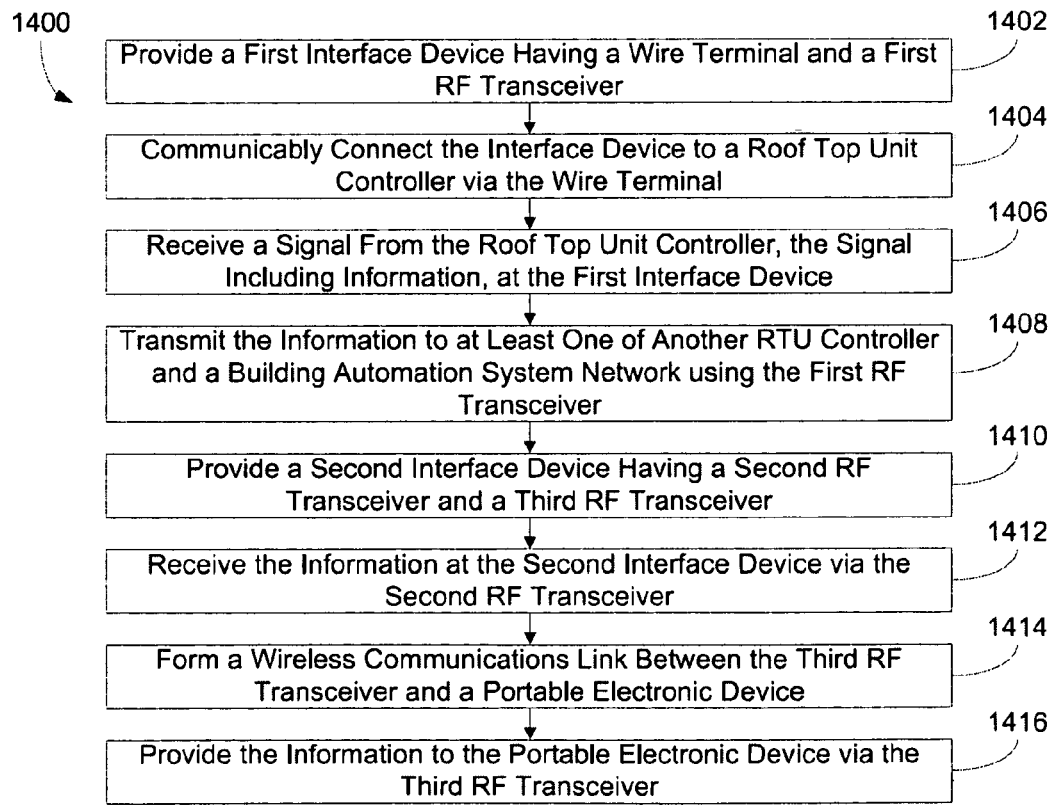
FIG. 14 is a flow chart of a process for transmitting information from an RTU to a portable electronic device using multiple interface devices, according to an exemplary embodiment.

Referring to FIG. 14, a flow chart of a process 1400 for transmitting information from an RTU to a portable electronic device using multiple interface devices is shown, according to an exemplary embodiment. A first interface device may be provided (step 1402) and communicably connected to an RTU controller via a wire terminal (step 1404). As shown and described above, the first interface device may have a wire terminal and a first RF transceiver for communicating with various RTUs and portable devices. A signal from the RTU controller may be received at the first interface device (step 1406) via the wire terminal. The signal may include information relating to the status of the RTU, a setpoint, a fan speed, or any other variable. The information received by the first interface device may be transmitted to at least one of another RTU controller and a BAS network using the first RF transceiver (step 1408).

A second interface device having a second RF transceiver and third RF transceiver may be provided (step 1410) and associated with a portable electronic device. According to an exemplary embodiment, the second interface device is a portable device or module that may be attached to or carried with a portable electronic device such as a Bluetooth enabled cellular phone by a user. The information transmitted by the first interface may be received at the second interface device via the second RF transceiver (step 1412). A wireless communications link may be formed between the third RF transceiver of the second interface device and a portable electronic device (step 1414), and the information may be provided to the portable electronic device via the third RF transceiver (step 1416). According to an exemplary embodiment, process 1400 may correspond to a system such as shown in FIG. 8, for example, with the first and second interfaces serving as communication bridges between the wire terminal of the RTU and the consumer-type transceiver (e.g., Bluetooth) of the portable electronic device.

Figure 15:
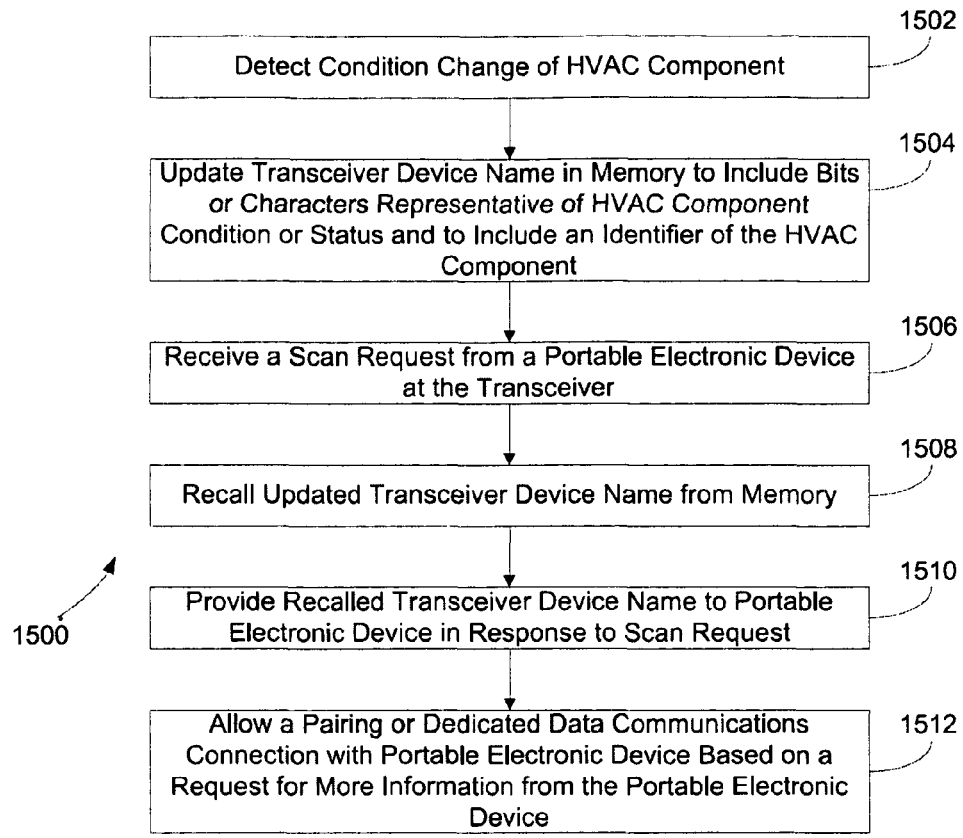
FIG. 15 is a flow chart of a process conducted by an HVAC component for communicating HVAC component status information to a portable electronic device via wireless communication, according to an exemplary embodiment.

Referring to FIG. 15, a flow chart of a process 1500 conducted by an HVAC component for communicating HVAC component status information to a portable electronic device via wireless communication is shown, according to an exemplary embodiment. The HVAC component may be detected by and connected with the portable electronic device (e.g., via a Bluetooth communications standard). According to an exemplary embodiment, the detection may occur when the portable electronic device is within ten meters of the interface device or controller. According to other exemplary embodiments, the range may be more or less (e.g., a one hundred meter range).

A condition change may be detected in or by the HVAC component (or by a controller associated therewith) (step 1502). A transceiver device name of a transceiver associated with the HVAC component may be updated in the memory of the HVAC component (step 1504). The update may include bits and/or characters representative of the changed (or current) HVAC component condition or status. The transceiver device name may further include a unique identifier of the HVAC component. According to an exemplary embodiment, the transceiver device name is a Bluetooth device name but could be any a WiFi device name or any other name or identifier that is commonly transmitted to scanning devices for the purpose of device identification.

A scan request may be received at the transceiver of the HVAC component from the portable electronic device (step 1506). The updated transceiver device name may be recalled by memory (step 1508) and provided to the portable electronic device in response to the scan request (step 1510). A pairing or dedicated data communications connection may be allowed and formed with the portable electronic device (step 1512). The pairing or connection may be allowed based on a request for more information from the portable electronic device, according to an exemplary embodiment.

Figure 16:
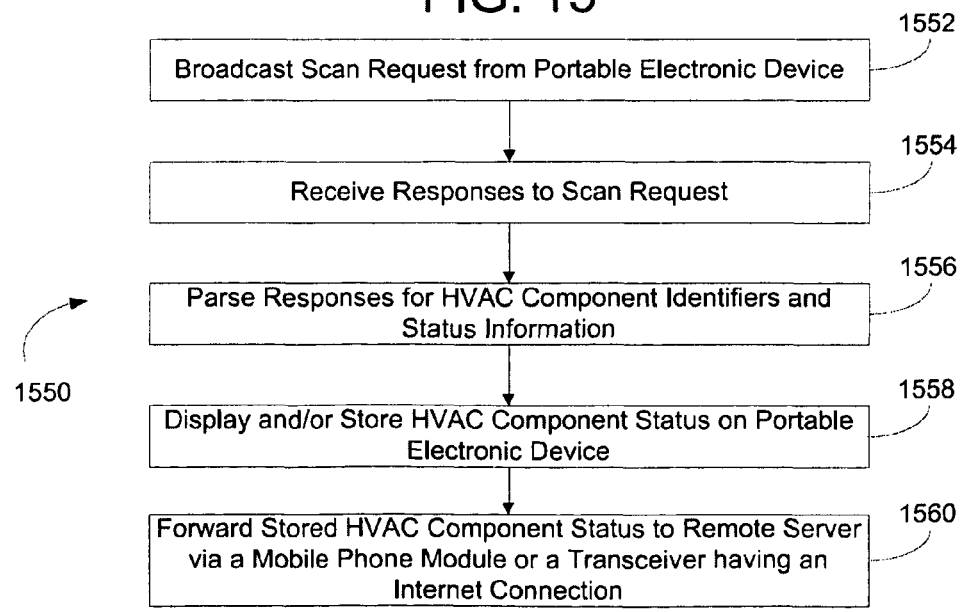
FIG. 16 is a flow chart of a process conducted by a portable electronic device for using wirelessly scanned HVAC component device names, according to an exemplary embodiment.

Referring to FIG. 16, a flow chart of a process 1550 conducted by a portable electronic device for using wirelessly scanned HVAC component device names is shown, according to an exemplary embodiment. The portable electronic device may broadcast a scan request (step 1552) and receive a response to the scan request (step 1554) including a transceiver device name (e.g., as updated above in step 1504 of FIG. 5A). The response may be parsed for HVAC component identifiers and status information (step 1556). The HVAC component status may be displayed and/or stored on the portable electronic device (step 1558). The stored HVAC component status may also be forwarded to a remote server via a mobile phone module or a transceiver having an Internet connection (step 1560).

The portable electronic device of FIGS. 15-16 may include various components for diagnosing the information received from the HVAC component. For example, the portable electronic device may be configured to process the information and to convert the information into an electronic format easily readable by a user (e.g., a rich text document, a plain text document, e-mail text, a PDF, an image, a spreadsheet, a table, etc.) or into any other information structure (e.g., a database, an array stored in memory, etc.). The information received by the portable electronic device may be "real time" information and/or may be historical data about the HVAC components. According to an exemplary embodiment, the portable electronic device may be further configured to relay HVAC component information to another portable electronic device, another network node, a remote server (e.g., via a cellular connection, via a WiFi connection, etc.), or to another building component based on user request or if the information indicates a necessity to do so (e.g., if the information indicates a warning should be sent out to another building component, a manager's pager, or a supervisory controller).

While the exemplary embodiments illustrated in the figures and described herein are presently preferred, it should be understood that the embodiments are offered by way of example only. Accordingly, the present application is not limited to a particular embodiment, but extends to various modifications that nevertheless fall within the scope of the appended claims.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for providing information from a controller for HVAC equipment to a portable electronic device, the method comprising:
   detecting, at the controller for the HVAC equipment, a condition or a status of a HVAC component, wherein the controller is associated with a transceiver;
   updating a transceiver device name of the transceiver to include an indication of the condition or status of the HVAC component and storing the updated transceiver device name in a memory device;
   receiving, at the transceiver, a scan request from a portable electronic device;
   recalling the updated transceiver device name from the memory device; and
   providing the recalled transceiver device name to the portable electronic device in response to the scan request, wherein the updated transceiver device name indicates the condition or status of the HVAC component without requiring a data communications link between the transceiver and the portable electronic device.

2. The method of claim 1, further comprising:
   establishing a data communications link between the transceiver and the portable electronic device in response to a request for more information received from the portable electronic device.

3. The method of Claim 2, wherein the updating the transceiver device name is performed in response to detecting a change in the condition or status of the HVAC component.

4. The method of claim 2, further comprising:
   receiving commands from the portable electronic device at the transceiver for the controller for the HVAC equipment; and
   providing the commands to the controller for the HVAC equipment in response to an input received wirelessly.

5. The method of claim 2, further comprising:
   interpreting the condition or status of the HVAC component according to a first data communications protocol compatible with the controller for the HVAC equipment; and
   using the interpretation to reform the condition or status for communication via the data communications link according to a second data communications protocol.

6. The method of claim 5, wherein the first data communications protocol is at least one of a BACnet protocol, a LON protocol, a Modbus protocol, and a proprietary protocol.

7. The method of claim 5, wherein the second data communications protocol is a wireless application protocol (WAP), the method further comprising:

describing the condition or status of the HVAC component according to at least one of an XML language, an XHTML language, and a WML language.

8. The method of claim 5, wherein the second data communications protocol is an HTTP protocol, the method further comprising:
describing the condition or status of the HVAC component according to at least one of an XML, XHTML, and HTML language.

9. The method of claim 1, wherein the condition or status of the HVAC component is detected using data communications conducted via at least one of an RS-485 terminal, an EIA-485 terminal, and a TIA-485-A terminal.

10. The method of claim 1, wherein the condition or status of the HVAC component is detected using data communications conducted via a universal serial bus terminal and the transceiver is compatible with a wireless USB protocol.

11. The method of claim 1, wherein the condition or status of the HVAC component comprises at least one of operational status information, alert information, sensor information, naming information, historical information, diagnostics information, and setpoint information.

12. The method of claim 1, wherein the portable electronic device is at least one of a mobile phone, a laptop, and a personal digital assistant.

13. The method of claim 1, wherein the condition or status of the HVAC component is communicated from the controller to the portable electronic device without using an application gateway.

14. The method of claim 1, wherein the condition or status of the HVAC component is communicated from the transceiver to the portable electronic device via a direct wireless communication.

15. The method of claim 1, wherein the transceiver is configured to communicate with the portable electronic device without joining a larger communications network.

16. The method of claim 1, wherein the transceiver is part of a portable device contained within a single portable housing.

* * * * *